United States Patent [19]
Wallace

[11] 3,991,005
[45] *Nov. 9, 1976

[54] STRUCTURAL MATERIAL AND METHOD

[76] Inventor: Richard A. Wallace, 43 Kings Cote Gardens, Stanford, Calif. 94305

[ * ] Notice: The portion of the term of this patent subsequent to Nov. 5, 1991, has been disclaimed.

[22] Filed: Jan. 31, 1974

[21] Appl. No.: 438,235

Related U.S. Application Data

[63] Continuation-in-part of Ser. No. 201,111, Nov. 22, 1971, Pat. No. 3,846,366.

[52] U.S. Cl. ............................. 260/38; 106/288 R; 106/DIG. 1; 260/37 EP; 260/37 SB; 260/39 SB; 260/40 R; 260/42; 428/2

[51] Int. Cl.² ......................................... C08G 51/04

[58] Field of Search .............. 260/37 EP, 38, 39 SB, 260/40 R, 12.37, 42 R, 37 SB; 106/288 B, 90, DIG. 1, 288 R; 428/2

[56] References Cited
UNITED STATES PATENTS

| | | | |
|---|---|---|---|
| 2,343,179 | 2/1944 | Hanck | 51/293 |
| 2,517,261 | 8/1950 | Veitch | 260/39 SB X |
| 2,940,154 | 6/1960 | Howard | 106/288 B X |
| 2,946,112 | 7/1960 | Tucker et al. | 106/288 B X |
| 3,383,228 | 5/1968 | Rekate et al. | 106/90 X |
| 3,770,466 | 11/1973 | Wilton | 106/DIG. 1 |
| 3,798,191 | 3/1974 | Donnelly | 260/37 EP X |
| 3,819,556 | 6/1974 | Morisawa | 106/DIG. 1 |
| 3,846,366 | 11/1974 | Wallace | 260/37 EP |

Primary Examiner—Donald E. Czaja
Assistant Examiner—S. M. Person
Attorney, Agent, or Firm—Flehr, Hohbach, Test, Albritton & Herbert

[57] ABSTRACT

A composition comprising an intimate bonded mixture of (a) 30–90 parts by weight of a particulate reinforcement filler formed of the pyrolysis or incineration residue of industrial or municipal solid waste products, and (b) 10–70 parts by weight of a resinous thermosetting (e.g., polyester or epoxy) or thermoplastic (e.g., nylon) adhesive polymer. The filler comprises a combination of silica and alumina and for pyrolysis residue, carbon. The individual particles are characterized by non-porous structure and irregular rough shapes, having a heterogeneous distribution and a size less than 50 microns.

19 Claims, No Drawings

STRUCTURAL MATERIAL AND METHOD

CROSS-REFERENCE TO RELATED APPLICATION

This application is a continuation-in-part of my copending parent U.S. application Ser. No. 201,111 filed Nov. 22, 1971, and now U.S. Pat. No. 3,846,366.

BACKGROUND OF THE INVENTION

A number of cast resinous objects have been produced which employ inert fillers dispersed throughout a thermosetting resin such as polyester. Known filler materials include limestone (calcium carbonate), glass fibers, asbestos, cinders, silicates, metal powders, quartz, clay, sand, alumina, volcanic ash, and the like.

It is common practice to mix several inert fillers with a resin binder to form a product of the desired properties. For example, it is well known that spherical particle shapes may be highly loaded in the binder but that such shapes do not form as strong an adhesive bond as do irregular shaped particles. On the other hand, irregular shaped particles of a generally uniform grade do not pack well and so a greater proportion of binder must be employed.

A composition formed of a polyester binder with calcium carbonate filler has been employed for a variety of synthetic marble products. Among the deficiencies of calcium carbonate filler is the relatively low tensile strength of the final product. Thus the product would have limited industrial application. Furthermore, since calcium carbonate is highly reactive with acid, a surface formed with it as filler may be permanently disfigured by acid contact.

There is a pressing need for sources of economical disposal of the residue of industrial and municipal solid waste treatment such as for recycled glass. Certain extremely fine residues (e.g., less than 50 microns) are particularly difficult to dispose of because, in their impure state, they are not suitable for use in recycled glass. Such fine residues include incinerated waste or coal fly ash and the residue of certain pyrolysis processes.

SUMMARY OF THE INVENTION AND OBJECT

It is a general object of the present invention to provide a composition with superior structural, chemical and electrical characteristics in comparison to the ones described above.

It is a particular object of the invention to form a valuable structural material using inexpensive pyrolysis or incineration waste residue as a polymer filler to reduce the problems of disposing of the residue.

It is another object of the invention to provide a composition of the above type which can be easily formed into any desired configuration.

It is still another object of the invention to provide a composition of the above type having a smooth surface with low frictional resistance as for use in the inner wall of pipe and which is safe for domestic objects such as formed sinks, wall and floor tiles, laboratory table tops or playground equipment.

In accordance with the above objects, particulate filler is fixed with flowable castable thermoplastic of thermosetting resin binder. The filler is a fine residue of industrial or municipal solid waste treatment comprising silica and alumina and having irregular rough shapes. The majority of the filler is heterogeneously sized at less than 50 microns in nominal diameter. The filled resin binder is formed of molded into a desired shape and solidified. The process can be carried out directly at the waste treatment plant to avoid costly shipment costs. In the final product, the polymeric binder is adhesively bonded to the filler particles.

Additional objects and features of the present invention will be apparent from the following description in which the preferred embodiments of the invention have been set forth in detail.

DETAILED DESCRIPTION OF THE PREFERRED EMBODIMENTS

The present invention is predicated upon a discovery that the pyrolysis or incineration residue of industrial or municipal solid waste products is an excellent particulate reinforcement filler material when intimately mixed with an adhesive resinous polymer binder. In particular, it has been found that fine residues (e.g., average size less than 50 microns in nominal diameter) such as incinerated waste or coal fly ash and certain pyrolysis products can be employed as filler to yield good properties. Heretofore, these residues had no beneficial use except the usage of coal fly ash as lightweight additive to cement. The invention is particularly useful when carried out in close proximity to the pyrolysis or incineration plant to reduce shipment costs of the residue and the loading and unloading of the filler.

Unless specifically designated to the contrary, the term "particulate filler" shall refer to the fine residue from the pyrolysis or incineration of industrial or municipal solid waste products obtained in the manner generally set forth herein.

In carrying out the process of the present invention, 30–90 parts by weight of particulate filler is intimately mixed with 10–70 parts by weight of flowable castable resin binder. Thereafter, the mixture is formed into a desired configuration as by molding or extrusion and the binder is solidified to form a solid structural composition in which the binder is adhesively bonded to the filler particles.

A typical incineration residue particulate filler according to the present invention is formed in a municipal incinerator to which continuous feed of solid refuse is supplied. One source of such refuse is raw concentrated sewage sludge obtained from sewage systems as of the tertiary treatment type. This material is typically vacuum filtered prior to incineration into inert sterile ash. Alternatively, raw solid garbage may be fed to the incinerator including papers, vegetable waste, glass, film, rocks, earth, plastics, ceramics, metals, wood, rubber, and the like. The incinerator gaseous environment is normally maintained with an excess of oxygen at approximately atmospheric pressure. A typical combustion temperature range of between 1600°–1900° F is employed. The waste material residence time may average about 30 minutes. In a typical incineration process, the stack gases are filtered to remove the fine particles as by means of a bag filter. Such fines (herein "waste fly ash"), normally have a size range of between 1–50 microns in nominal diameter with an average size less than 40 microns. As used hereinafter all micron size limitations refer to nominal diameter of particles which pass a screen of the same size opening. This fine fraction which is difficult to dispose of is a suitable filler in accordance with the present invention.

A typical analysis of the waste fly ash residue of a municipal incinerator produced from the above sewage sludge material incinerated in the above manner, obtained from Combustion Power Company of Menlo Park, California, is set forth in the following table.

TABLE 1

| MUNICIPAL INCINERATOR FLY ASH | |
|---|---|
| Content | Percentage |
| Silica ($SiO_2$) | 60–80 |
| Alumina ($Al_2O_2$) | 10–30 |
| Calcium Oxide | 8 |
| Iron Oxide ($Fe_2O_3$) | 5 |
| Titania ($TiO_2$) | 0.6 |
| $Na_2O$ | 3.0 |
| $K_2O$ | 2.0 |
| MgO | 1.0 |
| Combined total of copper, zinc, barium, and manganese oxides | 1.0 |

One pyrolysis system suitable for producing a residue for use as a filler, used by the Garrett Research and Development Company, LaVerne, California, is set forth in a paper entitled "New Techniques in the Pyrolysis of Solid Waste", presented before the American Institute of Chemical Engineers of Aug. 29, 1972, incorporated herein by reference and referred to as the "Garrett process". Briefly described, in that process the raw refuse is pretreated prior to pyrolysis to deliver dry, finely divided material to the pyrolysis reactor while recovering magnetic metals and clean glass.

During pretreatment, the industrial of municipal refuse of the type described with respect to incineration first is shredded and fed to an air classifier. The overflow is dried and screened successively at, say ¼ inch and 14 mesh to remove the finer inorganics through the screen. The larger particles are then collected and fed to a pyrolysis reactor. The described heating techniques is "flash pyrolysis" carried out at atomospheric pressure and in an oxygen-deficient atmosphere to decompose organic matter and produces a solid residue as one component. The fine pyrolysis residue of the process described in the above Garrett paper is of a size essentially less than 40 microns and the average size is at a size less than 40 microns. A typical pyrolysis residue contains a majority (e.g., approximately 70% of inorganic ash comprising mixed inert metal inorganic oxides such as alumina, and non-metal oxides such as silica and a minority (e.g., approximately 30%) of primary carbon in the form of char or carbonized residue. A typical non-carbon portion may includes a majority of silica and alumina.

A typical pyrolysis unit employs an oxygen-free environment at about one atmosphere total pressure and a temperature of about 1900° F. Residence time varies between 20 and 30 minutes. The flash pyrolysis unit operates at a temperature of about 900° F and a residence time less than 30 seconds.

Although carbon-rich fractions have been separated from the pyrolysis residue for use as a filter for waste water treatment, such fractions tend to contaminate the effluent. The remainder of the residue, conventionally disposed of as land fill and the like, may be employed as a particulate filler according to the present invention. Preferably, the entire residue is used as the filler since there is no known beneficial use for the carbon-rich fraction except as a possible low-grade fuel. Thus the percentage of carbon in the pyrolysis residue particulate filler may vary from a trace, say, 1–5%, to 30–40% or more depending on the process and amount of carbon removed prior to use as filler.

Another suitable municipal incinerator residue for use as particulate filler herein in the lightweight fly ash produced in a pulverized coal power plant. To distinguish from the above waste fly ash, this material is referred to as "coal fly ash" herein. A typical analysis of such coal fly ash is set forth in the following table.

TABLE 2

| Ingredient | Percent by Weight |
|---|---|
| $SiO_2$ | 34–50 |
| $Al_2O_3$ | 17–30 |
| $Fe_2O_3$ | 7–26 |
| CaO | 1–10 |
| MgO | 0.5–1.6 |
| $SO_3$ | 0.2–3.6 |
| Residual carbon | 2–12 |

Another waste product suitable for filler is the pyrolysis product of a paper-aluminum scrap plant. In one plant, using a Nichols-Herrschoff charring furnace, the pyrolysis residue is extremely fine (about 80% sized at 1–20 microns and 20% at 20–50 microns). The approximate chemical analysis is about 50% carbon, 25% alumina and 25% ash and volatiles. The strength of polyethylene is significantly improved using this residue as a filler.

In a conventional waste treatment plant, prior to pyrolysis or incineration, the waste solids are treated in a number of different so-called "front-end" operations. The operations produce many different fine inert inorganic and combustible organic residues or rejects, including silica and alumina, which are now employed as landfill. Such residues may be employed as auxiliary filler in the present invention.

In a specific front-end system, during the pretreatment stage of the foregoing Garrett process the small particles which pass through the screen together with the underflow from the air classifier are processed for glass and metal recovery. Details of the Garrett glass recovery process are set forth in a paper entitled "Glass Recovery from Municipal Trash by Froth Flotation" presented at the "Proceedings of the Third Mineral Waste Utilization Symposium" (Chicago, Ill., March 14–16, 1972) by Garrett Research and Development Co., incorporated at this point by reference. The material underflow from the classifier is screened at, say, ¼ inch mesh and most metal, wood and the like are removed as oversize. The undersize is pulped in water and the sink material ground in a rodmill and screened with removal of the +8 mesh fraction (containing metal, plastic and rubber). The −8 mesh material containing ground glass, bricks, bones, stones, ceramic, plastic, ash and slag is milled to −32 mesh and classified to remove the −300 mesh fines which is thickened and dried. The last named fines are termed "slimes". The −32 +300 mesh fraction is repulped and fed to a flotation cell from which the flotation and sink product, termed "flotation tailings", are removed, and dewatered. The dewatered slimes have an average −200 +600 mesh size and typically comprise about 70% glass, 20% bricks, cement, dirt and the remaining 10% include plastics and wood fibers. Slimes and tailings represent a waste disposal problem.

The above slimes and tailings comprises a front-end residue and contains no significant metal and phosphate values. The ratio of (a) pyrolysis or incineration residue to (b) the combination of slimes and tailings or other front-end residue is dependent upon the relative availability of these materials. A typical ratio might be 10–90% of the former to 10–90% of the latter.

Other auxiliary fillers which may be used to supplement the above pyrolysis or incineration residue include the residue from tree bark and agricultural refuse.

The residue of pyrolysis, even after primary carbon removal, or of incineration contains trace quantities of carbon. Such carbon imparts a black homogeneous color to the final composition according to the present invention. However, as described hereinafter, different colors may be obtained by the addition of small quantities of pigment to the mixture prior to solidification. The presence of small amounts (e.g., up to 10%) of carbon in the particulate filler also increases the electrical conductivity of the final composition. This is important in the manufacture of static-free floor tiles.

The particles of the above pyrolysis residues and incineration residues (waste and coal fly ash) have a number of common physical properties. They have a size ranging from 1–50 microns in a heterogeneous distribution and a typical average size of 40 microns or below, ranging from 30 to 40 microns. Because of this small size, the particles are normally considered to be a disposal problem. It is apparent that the maximum degree of packing is enhanced by this small size and wide distribution, an important consideration since it is economically desirable to employ a high proportion of inexpensive filler in the final composition.

Another important characteristic of the individual particles of the filler is the non-porous irregular rough shape naturally produced during either pyrolysis or incineration. Such rough shapes tend to form a stronger adhesive bond with the polymeric binder than do smooth shapes. The rough surface texture also increases the strength of the resin-waste residue bonding by providing a high degree of mechanical interlocking between the residue particles and resin.

The particles of the filler have a generally non-porous structure so that there is no substantial penetration by the flowable resin binder precursor. It is apparent that a deposit of the relatively expensive binder material within a porous filler structure would be wasteful since such deposit has no adhesive function.

The pyrolysis residue of the present invention is generally characterized by individual granules which, due to the presence of the carbon, form elongated fibrous strands in aggregate which are clearly visible at the high magnification of a photomicrograph. It is believed that the carbon attracts the grannules and physically links them in a fibrous formation. A polymer product filled with this residue is characterized by high strength. This is believed to be largely due to the fibrous form of the residue which causes it to behave in an analogous manner to macroscopic fibrous fillers.

The incinerator residue includes individual flake and needle-like particles which assist the strength characteristic. However, there is no significant interlinkage of these particles in comparison to the particles of the pyrolysis residue. The difference is believed to be due to the effect of the carbon in the pyrolysis residue.

The pyrolysis and incinerator residue for use as particulate filler has common chemical constituents, namely, alumina and silica. As set forth above, the pyrolysis residue additionally includes a significant quantity of carbon. A typical combined amount of alumina and silica in the filler on a carbon-free basis is on the order of 30–80 weight percent in the incinerator residue and in the pyrolysis residue. It has been found that this filler is essentially devoid of free metal particles.

The resin employed as a binder according to the present invention is either a thermosetting or thermoplastic polymer. It must be flowable or fluid during mixing with filler so that the composition may be formed into a desired configuration. Also, it must be capable of adhesively bonding with the filler particles to form a solid structural composition upon solidification.

Thermosetting resins suitable for the present invention include epoxy resins formed from a mixture of epichlorohydrin and bisphenol, phenolic resins formed from formaldehyde and phenol, polyesters formed from a mixture of a polyfunctional alcohol and a polyfunctional acid. Other thermosetting resins which may be employed of the thermosetting type are aminos, alkyds, urethanes, silicones, cross-liked polyethylene, and the like.

A listing of polyester resin particularly suitable for the purpose of the present invention is described in the chapter entitled "Polyesters" by Edward H. Meyer, *Modern Plastics Encyclopedia*, issue for 1965, September, 1964 pp. 235–240 and the references cited therein and "Polyesters and Their Applications" by Bjorksten et al., Reinhold, N.Y., 1956.

Suitable castable polyesters comprise a solution in styrene of the esterification product of a glycol, such as propylene glycol and dibasic acids. The dibasic acids include phthalic anhydride, or isophthalic acid and maleic anhydride. When properly catalyzed with a peroxide, such as benzoyl peroxide or methylethylketone peroxide, the styrene reacts with the unsaturated maleic groups to form the thermoset resins. Only small amount of catalyst, in the range of 0.5 to 1.0%, are employed.

Particularly effective phenolic resins have a molar ratio of formaldehyde to phenol in an approximate ratio of from 2 to 3 parts to 1. These resins may be slowly cured by heating for 1 to 3 days at 70°–80° C or may be cured more rapidly (e.g., from 1–4 hours) at 20° C by the addition of small amounts (e.g., 1–5%) of acid.

If desired, the filler materials of present invention may be employed to reinforce a thermoplastic resin binder. Suitable ones include nylon, polycarbonates, acrylics, polymethyl methacrylate, acetals, vinyls, polyvinyl chloride, cellulosics, polystyrene, chlorinated polyethers, fluorocarbons, polypropylene, high and low density polyethylene, polyurethane, styrene-butadiene-ethylene or propylene rubber blend, terpolymer, polyisobutylene and styrene-butadiene rubbers, phenylene oxides, polysulfones coumarone, and block or graft copolymers and any other or blend of the foregoing filled polymers.

Molding techniques for the above filled polymers include conventional injection molding and extrusion as with a multi-screw vented extruder.

Filled polymers of the present invention that are well suited to continuous molding include wall and floor tiles, pipe and pipe sections for water distribution, irrigation, and the like, and telephone and electrical conduits and the like. In suitable continuous injection molding operations especially adapted for thermoplastic polymer, the fine particulate filler is fed continuously into the feed section or hopper of the molding apparatus and admixed with the polymer under sufficient heat to soften the polymer, typically in granular form, into fluidity.

After being formed into a desired configuration the polymer is cooled to room temperature and solidified. In this type of molding, a thermoplastic resin of one of the foregoing types comprises the flowable castable resin binder of the present invention.

Flowable castable resin binder in the present application also includes polymerizable resin binder precursors of the thermoplastic or thermosetting type which are flowable prior to polymerization and solidify after polymerization. The molding techniques for such materials are generally non-continuous and include filling a mold of a desired configuration with the flowable resin binder precursor intimately mixed with filler and then allowing the mix to solidify.

It has been found that a desired color may be imparted to a composition of the foregoing type by the addition of a suitable pigment. For example, the composition may be colored red by the addition of iron oxide, white by the addition of titanium oxide, blue by the addition of phthalocyanine blue, green by the addition of phthalocyanine green, and so forth. It has been found that a relatively small percent of pigment, on the order of ½% or less, is sufficient to impart the desired color to the entire composition. The pigment is added to the binder and filler in the mixing stage. It is noted that the blended coloring effects of conventional synthetic marble may be obtained using a composition of the present invention.

The final composition of the present invention is characterized by high flexural, tensile, compressive and impact strength set forth in detail hereinafter. In addition, it is exceptionally resistant to acid and, in general, to other corrosive chemicals. The surface is characterized by relatively high hardness and is easily machinable. Furthermore, the final composition will be formed with a smoothness comparable to that of the mold.

The materials show excellent weather-resisting properties against low temperatures and exposure to ultraviolet and infrared radiation for extended periods of time. Pipes formed of this composition show excellent dimensional stability and uniformity under either tensile or compressive loadings at extreme temperatures of $-60°$ up to $300°$ F. These pipes are also essentially impermeable to water and calcium chloride solutions.

The composition of the present invention as high chemical resistance. Thus it is particularly well suited for underwater structures such as exposed dam sections and beams in either fresh or salt water environments. Also, it is well suited for large diameter cast storage pressure vessels, or tanks, especially for containing corrosive chemicals.

The above exceptional properties are obtainable in a relatively lightweight material in comparison to those commonly used for a similar purpose, for example, steel-reinforced concrete used in large diameter pipes. Furthermore, the density of the present composition may be controlled by forming with air (e.g., by agitation) to a desired specific gravity in the range of, say, 1.2 to 2.2. The use of common foaming agents or resins, such as polyurethanes, may also be employed for density control.

A suitable composition according to the present invention includes 30–90 parts by weight of filler and 10–70 parts by weight of binder. A preferable composition includes 60–85 parts by weight of filler and 15–40 parts by weight of binder. Above 90 parts by weight of filler, it is difficult to effectively bind the particles together to form a composition having the mechanical properties described above. Furthermore, the uniformity of the overall composition would suffer. As the proportion of the binder, which is much more expensive than the filler, is increased to, say, 40 parts by weight or more, the cost of the final composition becomes prohibitive for most applications.

It is apparent from the foregoing that a large variety of inexpensive molded compositions are produced according to the present invention. The aforementioned properties enable the material to be used as a self-supporting structure without the necessity of an external support structure.

The composition is particularly well adapted for use in the molding of large diameter pipes or conduits, say, 2 feet or more in diameter. The conventional material presently used for that purpose is steel-reinforced concrete. This material is relatively expensive to form and is extremely heavy and cumbersome to work with. Furthermore, it has a rough coarse surface which creates large frictional losses by fluids flowing within the pipes. To avoid this, it is conventional to employ smooth linings within the pipes which increase their cost. In contrast, large diameter pipes produced in accordance with the present invention are less expensive, water-impervious, lighter, and have a smooth surface texture eliminating the need for lining.

The smooth surface which is obtained simply by casting renders it suitable for any object with an unusual or irregular configuration. For example, it could be used in playground areas for unusual objects suitable for climbing. Also, the excellent mechanical and chamical properties render it particularly well suited for floor or roof tiling.

In order to more clearly disclose the nature of the present invention, specific examples of the practice of the invention are hereinafter given. Parts are expressed in terms of parts by weight unless otherwise specified. All pyrolysis residue in the examples was formed by the Garrett process. It should be understood, however, that this is done by way of example and is intended neither to delineate the scope of the invention nor limit that of the appended claims.

EXAMPLE 1

Unplasticized polyvinyl chloride (100 parts by weight) was intimately admixed with 30 parts filler comprising 90% pyrolysis product (average size 40 microns) and 10% of slimes for municipal pyrolysis residue from the aforementioned Garrett process. Lubricant and processing aids, such as paraffin waxes, low molecular weight polystyrene and calcium stearate, (10 parts) are incorporated into the above mixture. The above mixture was blended with 5 parts of impact additive polymer (ethylene-propylene copolymer). The homogenized mixture was transported in an air stream to a twin-screw conventional extruder. The combination of the mechanical movement of the screw and heat supply to the material further homogenized the mixture. In this instance, the material was extruded into pipes suitable for the transportation of sewage and into telephone ducts. The pyrolysis residues had no adverse effect on the extrusion process.

Unexpectedly, it was found that the filler actually promoted flow and easier molding qualitites in comparison to a comparable precipitated calcium carbonate filled polyvinyl chloride mixture. Table 3 represents the physical properties of the above extruded product.

TABLE 3

| FILLED RIGID POLYVINYL CHLORIDE | |
| --- | --- |
| Property | Value |
| Tensile Strength | 3,400 p.s.i. |
| Compressive Strength | 16,500 p.s.i. |
| Impact Strength | 0.20 ft-lb/inch |
| Hardness, Rockwell | 90 shore D |
| Increase of Heat Distortion Temperature over Unfilled Rigid Polyvinyl Chloride | 18° C |

EXAMPLE 2

100 parts of rigid polyvinyl chloride modified by 5 parts of acrylonitrile-butadiene-styrene terpolymer, 5 parts of lubricant paraffin wax were mixed with 30 parts by weight of the municipal incinerator fly ash (average particle size of 40 microns) residue of the type generally set forth in Table 1 above. The above mixture was homogenized in a conventional low-shear, twin-screw blade blender and then transferred to a continuous extruder operated at 375° F to produce rigid, non-pressure sewage pipes and telephone ducts. Table 4 presents the physical properties of the above product.

TABLE 4

| FILLED MODIFIED RIGID POLYVINYL CHLORIDE | |
| --- | --- |
| Property | Value |
| Tensile Strength | 3,100 p.s.i. |
| Compressive Strength | 15,000 p.s.i. |
| Impact Strength | 0.6 ft-lb/inch |
| Hardness, Rockwell | R120 |
| Increase of Heat Distortion Temperature over Unfilled Acrylonitrile-Butadiene-Styrene Modified Polyvinyl Chloride | 14° C |

EXAMPLE 3

The purpose of this experiment is the formation of flooring tiles. Finely divided (average size of 40 microns), municipal incinerator fly ash was utilized as the filler. Plasticized polyvinyl chloride (200,000 average molecular weight) was used as the resin binder. The individual components of the mix were as follows:

TABLE 5

| Ingredient | Percentage by Weight |
| --- | --- |
| Polyvinyl Chloride | 45 |
| Liquid Plasticizer (dioctyl phthlate) | 20 |
| Antioxidant Stabilizer (barium salts) | 1 |
| Pigment (cadmium yellow) | 4 |
| Incinerator fly ash (average size 40 microns) | 30 |

The above filllers were intimately mixed into the plasticized polyvinyl chloride in low-shear twin-screw blade mixer. This mixture was then continuously extruded at 350° F to form extruded sheets which were cooled and sectioned into flooring tiles. Such tiles were found to have a high strength modulus in comparison to the conventional ground calcium carbonate filled material used for flooring and at a lower cost than the conventional material.

EXAMPLE 4

The above procedure was followed to form flooring sheets utilizing the following materials:

TABLE 6

| Ingredient | Percentage by Weight |
| --- | --- |
| Vinyl chloride - vinyl acetate copolymer | 13 |
| Dibutyl phthlate (plasticizer) | 7 |
| Antioxidant Stabilizer | 1 |
| Pigment | 1 |
| Asbestos fibers | 28 |
| Pyrolysis residue from Garrett process (average size 40 microns) | 50 |

In a variation of the above experiment 20 parts by weight of slimes from the Garrett process were blended in the above mixture to form a comparable flooring product. Both types of products were continuously extruded. They had excellent ultra-violet protection characteristics.

EXAMPLE 5

In this experiment 70 parts of waste fly ash (average size 40 microns) of the type set forth in Table 1 was mixed with 30 parts of polystyrene to form extruded rods. The materials were blended continuously and fed into the hopper of a vented screw extruded at the rate of 800 pounds per hour. Moisture and volatiles were removed through the extruder vents. The temperature of extrusion was 490° F.

The products removed from the extruder dye were 6 foot lengths of filled polystyrene rods having a rectangular cross-section. The following table illustrates the physical properties of the foregoing rods.

TABLE 7

| FILLED POLYSTYRENE | |
| --- | --- |
| Property | Value |
| Tensile Strength | 5,800 p.s.i. |
| Compressive Strength | 13,500 p.s.i. |
| Impact Strength | 0.25 ft-lb/inch |
| Hardness, Rockwell | M95 |
| Increase of Heat Distortion Temperature over Unfilled Polystyrene | 25° C |

EXAMPLE 6

The above procedure was followed with the exception that pyrolysis char residue of the Garrett process was substituted for the waste fly ash. The final product was opaque and resistant to ultra-violet light. It also had the following physical characteristics: increased dimensional stability, resistant to warpage, good stiffness and high strength.

EXAMPLE 7

The procedure of Example 5 was followed with the exception that 60 parts of waste fly ash was utilized as a filler with 40 parts of styrene-butadiene thermoplastic elastomer. The following table illustrates the properties of the above materials:

TABLE 8

FILLED STYRENE-BUTADIENE THERMOPLASTIC ELASTOMERS

| Property | Value |
|---|---|
| Tensile Strength | 6,500 p.s.i. |
| Compressive Strength | 4,700 p.s.i. |
| Impact Strength | no break |
| Hardness, Rockwell | 90 shore A |
| Increase of Heat Distortion Temperature over Unfilled Styrene-Butadiene Elastomer | 24° C |

EXAMPLE 8

The procedure of Example 5 was followed utilizing a mixture of 60 parts pyrolysis residue from the Garrett process as a filler with 40 parts of an acrylonitrile-butadiene-styrene polymer to form extruded sheets. The properties of this material are listed in the following table:

TABLE 9

EXTRUDED FILLED ACRYLONITRILE-BUTADIENE-STYRENE TERPOLYMER

| Property | Value |
|---|---|
| Tensile Strength | 3,200 p.s.i. |
| Compressive Strength | 15,500 p.s.i. |
| Impact Strength | 1.0 ft-lb/inch |
| Hardness, Rockwell | R120 |
| Increase of Heat Distortion Temperature over Unfilled Acrylonitrile-Butadiene-Styrene | 33° C |

EXAMPLE 9

In this Example, the filler comprised 25% by weight of tailings from the above Garrett process and 75% by weight of the pyrolysis residue from the same process. The filler has approximately 50% by weight of carbon and 50% by weight of inorganics and had an average size on the order of 45 microns. The above material was mixed with low-density polyethylene in a standard twin-screw injection molding machine at injection cylinder temperature of about 450° F. A mixture of 35 parts by weight of polyethylene resin and 65 parts by weight of combined fillers were employed. The final compositions had increased dimensional stability, stiffness, strength and heat distortion temperatures in comparison to the unfilled resins. Optical analysis illustrated that the filled polymer had improved resistance to stress cracking and to ultra-violet degradation.

EXAMPLE 10

The procedure of the proceeding Example was followed with the substitution of polypropylene for polyethylene and utilizing a cylinder temperature of 495° F. The physical properties of the final injection molded composition are as follows:

TABLE 10

FILLED POLYPROPYLENE

| Property | Value |
|---|---|
| Tensile Strength | 2,700 p.s.i. |
| Compressive Strength | 3,700 p.s.i. |
| Impact Strength | 0.40 ft-lb/inch |
| Hardness, Rockwell | R100 |
| Increase of Heat Distortion Temperature over Unfilled Polypropylene | 32° C |

EXAMPLE 11

Pyrolyzed residue comprising about 30% char carbon and about 70% inorganic ash were mixed in different experiments with polyethylene and polyvinyl chloride. A loading of about 60 parts of filler and about 40 parts of polymer was utilized. The average size of the finely divided filler was about 38 microns. The above mixture was thoroughly mixed and fed by gravity into the hopper of a continuous screw extruder. The average polyethylene melt temperature was about 450° F. The mold shrinkage was found to decrease with increased filler. The pyrolysis residue served as an excellent lubricant and pigment in the material to facilitate processing in the screw extruder.

The average melt temperature for the same ratio of materials utilizing polyvinyl chloride was about 360° F and using polystyrene was about 485° F. A similar decrease of mold shrinkage and increase in creep resistant was measured in the final product.

EXAMPLE 12

In this experiment, the filler comprised the pryolysis residue (average size 40 microns) and including about 20% by weight of char carbon and about 80% by weight of inorganic metal oxides and crushed rocks. This filler was incorporated in different experiments into polyurethane thermoplastic polyester and into phenylene oxide resin at about 400° F at about equal ratios of filler to polymer. The polymers were processed into fabricated parts using a heavy duty twin-screw compounding extruder to fabricate continuous sheets. Because of the large quantities of carbon in the filler, the extruded sheets were essentially static-free.

EXAMPLE 13

The procedure of the preceeding experiment was followed with the addition of 10 parts of ¼ inch long chopped glass fibers to the residue. The physical properties of the resultant product were significantly improved.

EXAMPLE 14

The procedure of Example 12 was followed. The filler comprised waste fly ash of the type set forth in Table 1 (average size 40 microns). The polymer employed was phenylene oxide. The characteristics of the product are set forth in the following table:

TABLE 11

INJECTION MOLDED FILLED PHENYLENE OXIDE

| Property | Value |
|---|---|
| Tensile Strength | 10,800 p.s.i. |
| Compressive Strength | 24,500 p.s.i. |
| Impact Strength | 0.65 ft-lb/inch |
| Hardness, Rockwell | L12 |
| Increase of Heat Distortion Temperature over Unfilled Phenylene Oxide | 35° C |

EXAMPLE 15

In this Example, the filler employed was a municipal incinerator fly ash of the type set forth in Table 1 at an average size of about 45 microns. This filler was mixed with nylon in approximately an equal ratio by weight in a standard reciprocating-screw injection molding machine at a cylinder temperature of about 525° F. The filler was found to promote flow during molding as well as to reinforce the compressive strength, abrasion resistance, stiffness and hardness of the filled nylon in comparison to the base resin.

EXAMPLE 16

The above procedure was followed using a filler comprising 20 parts by weight asbestos and 80 parts by weight of the waste fly ash of the type set forth in Table 1. Equal parts of this mixed filler were in turn compounded with nylon resin and injection molded. The filled product had a tensile strength of 22,000 p.s.i. and heat distortion of about 350° F.

EXAMPLE 17

In this Example, 85 parts by weight of waste fly ash (average size 40 microns) was dry blended with a soft coumarone-indene resin. The homogenized mixture was fed by gravity to a conventional screw extruder operated at a melt temperature of about 440° F to form extruded sheets. The tensile strength and compressive strengths were 750 p.s.i. and 8,100 p.s.i., respectively. The sheets possessed good dimensional stability, stiffness and abrasion resistance.

EXAMPLE 18

This experiment illustrates the addition of a minor amount of a silane coupling agent. 50 parts by weight of liquid polyester resin were mixed with a like quantity of waste fly ash of the type set forth in Table 1. To this waste fly ash was added about 0.010 parts of vinyl methacrylate silane. The composition exhibited a 70% improvement in the flexural strength and 50% upgrading in tensile strength in comparison to the untreated waste fly ash filled polyester.

EXAMPLE 19

Waste fly ash of the type set forth in Table 1 was used as the filler. A low-viscosity (Brookfield viscosity of about 500 CPS at 77°) epoxy resin was mixed with the filler at a ratio of 60 to 40 parts by weight. To this mixture was added 30 parts by weight of liquid low-viscosity modified polyamine hardener. The resultant product was a high-strength hard coating. This is believed due to the excellent wetting and adhesion of the fly ash to the epoxy resin.

The laboratory table top (¾ inch thick) had good chemical inertness and dimensional stability. The tensile strength and compressive strength of the product was 6,200 p.s.i. and 24,200 p.s.i., respectively.

EXAMPLE 20

The fly ash of the proceeding Example was incorporated into liquid polyester resin and cured in a ratio of 70% by weight of filler to 30% by weight of polyester binder. The tensile and compressive strengths for this laboratory table top (½ inch thick) was found to be 3,000 p.s.i. and 18,400 p.s.i., respectively.

EXAMPLE 21

A pyrolysis residue of the aforementioned Garrett process (average size about 40 microns) and comprising 70% inorganic ash and metal oxides and about 30% of char carbon were used as a filler with a liquid epoxy resin of the type set forth in Example 19 cured with the same type of hardener. The ratio of filler to resin binder was 70 parts of the former to 30 parts of the latter. The resulting composition has tensile and compressive strengths of 7,200 p.s.i. and 25,500 p.s.i., respectively. In addition it had good anti-friction characteristics. Loadings as high as 80% of filler were obtainable.

EXAMPLE 22

The procedure of the preceding Example was followed with the exception that liquid polyester was substituted for the epoxy resin. The resultant polyester had reduced mold shrinkage and was stiff and rigid. The respective tensile and compressive strengths of the material were 6,100 p.s.i. and 20,000 p.s.i., respectively.

EXAMPLE 23

Coal fly ash residue (average particle size was about 35 microns), obtained from a coal power plant and having the chemical composition as listed in Table 2, was utilized as a reinforcing filler. This coal fly ash was readily dry blended with low-density polyethylene resin in the ratio of 70 parts by weight of fly ash to 30 parts by weight of polyethylene resin. The homogenized mixture was then continuously extruded at about 410° F into two-feet internal diameter pipes or telephone duct sections. The final physical properties of this coal fly ash-filled polyethylene were greatly improved relative to the base polyethylene resin. For example, the flexural and compressive strengths increased by 30%. Increased dimensional stability of heat distortion temperature were also found, compared to the unfilled low-density polyethylene.

EXAMPLE 24

The procedure of Example 3 was followed with the same ingredients except that the incinerator filler comprised coal fly ash of the type set forth in Table 2 (average size 35 microns).

EXAMPLE 25

The coal fly ash of the preceding Example was incorporated into liquid polyester resin and cured in a ratio of 70% by weight of coal fly ash to 30% by weight of polyester binder. The tensile and compressive strengths for this material was found to be 2,800 p.s.i. and 20,000 p.s.i., respectively.

EXAMPLE 26

The procedure of the preceding Example was followed with the exception that liquid epoxy resin and hardener of the type set forth in Example 19 was substituted for the polyester. A ratio of 60% by weight of coal fly ash to 40% by weight of epoxy resin and hardener was utilized.

We claim:
1. A non-porous composition consisting essentially of an intimate mixture of 30 to 85% of filler and 15–70% of a resinous adhesive polymer binder bonding said particles together, said filler comprising a particulate pyrolysis or incineration residue of industrial or mu- nicipal solid waste treatment and also comprising silica and alumina, said residue particles being characterized by non-porous structure and irregular rough shapes, said residue particles having a non-homogeneous distribution and a size less than 50 microns in nominal diameter, said composition having a specific gravity in excess of 1.2.

2. A composition as in claim 1 in which the average size of the residue particles is no greater than 40 microns.

3. A composition as in claim 1 in which said filler is essentially devoid of free metals.

4. A composition as in claim 1 in which said filler comprises the residue of pyrolysis.

5. A composition as in claim 4 in which said filler includes a substantial amount of free carbon.

6. A composition as in claim 1 in which said filler comprises the fly ash residue of incineration.

7. A composition as in claim 1 in which said polymer binder is a thermoplastic resin.

8. A composition as in claim 1 in which said thermoplastic material is selected from the group consisting of polyvinyl chloride homopolymer and copolymers, polyacrylates, polyacetals, polymethyl, methacrylate, polyethylene, polypropylene, polystyrene, nylon, polycarbonates, cellulosics, fluorocarbons, polytetrafluoroethylene, acrylonitrile-butadiene-styrene, terpolymer, phenylene oxide polymer, polysulfone, and chlorinated polyether, and mixtures of the same.

9. A composition as in claim 1 in which said polymer blender is a thermosettng resin.

10. A composition as in claim 9 in which said thermosetting resin is selected from the group consisting of epoxy resins, amino resins, alkyds, polyurethanes, polysilicones, polyesters, and phenolic resins.

11. In a method for forming non-porous filled resin products, the steps of forming a mixture consisting essentially of 30 to 85% of filler with 15–70% of a flowable extrudable adhesive polymer resin binder, said filler comprising a pyrolysis or incineration residue of industrial or municipal solid waste treatment and also comprising a combination of silica and alumina, said filler particles being characterized by non-porous structures and irregular rough shapes, the majority of said filler particles having a non-homogeneous distribution and a size less than 50 microns in nominal diameter, shaping said mixture while in a flowable state into a desired configuration and solidifying the binder to form a solid composition in which the binder is adhesively bonded to said filler particles.

12. A method as in claim 11 in which said filler is essentially devoid of free metal particles.

13. A method as in claim 11 in which said binder is a thermosetting polymerizable resin binder precursor in which said binder is solidified by polymerization.

14. A method as in claim 11 in which said flowable castable binder is a thermoplastic polymer in a liquid state.

15. A method as in claim 11 in which said filler is formed by pyrolyzing or incinerating industrial or municipal solid waste products.

16. A method as in claim 11 in which said industrial or municipal solid waste product is incinerated and filtered into a coarse fraction and a fine fly ash fraction, and the latter fraction forming said filler.

17. In a method for forming a structural composition the steps of
a. pyrolyzing or incinerating industrial or municipal solid waste products and forming a residue containing silica and alumina, said residue being characterized by non-porous structures and irregular rough shapes, the majority of said filler particles having a non-homogeneous distribution and a size less than 50 microns in nominal diameter,
b. forming an intimate mixture consisting essentially of 30–85% of filler with 15–70% of a flowable extrudable resin binder, said filler comprising said particulate residue,
c. shaping the mixture of step (b) into a desired configuration while in a flowable state, and
d. solidifying said binder to form a structural composition in which binder is adhesively bonded to said filler material.

18. A method as in claim 17 in which said flowable castable binder of step (b) is a polymerizable resin precursor and said binder of step (d) is solidified by polymerizing the resin precursor.

19. A method as in claim 17 in which said solid waste products are pyrolyzed and said particulate residue includes a substantial amount of carbon.

* * * * *